US007880110B2

(12) United States Patent
Carey et al.

(10) Patent No.: US 7,880,110 B2
(45) Date of Patent: Feb. 1, 2011

(54) OPERATIONS FOR PRODUCT PROCESSING

(75) Inventors: Patrick J. Carey, Endwell, NY (US); Bruce H. Hanson, Endicott, NY (US); Dale J. Larson, Newark Valley, NY (US); Michael A. Wisniewski, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/364,917

(22) Filed: Feb. 3, 2009

(65) Prior Publication Data

US 2009/0145814 A1 Jun. 11, 2009

Related U.S. Application Data

(62) Division of application No. 11/018,677, filed on Dec. 22, 2004, now Pat. No. 7,507,930.

(51) Int. Cl.
*G06K 9/00* (2006.01)

(52) U.S. Cl. ........................ 209/584; 209/583; 209/900

(58) Field of Classification Search ................. 209/583, 209/584, 900; 700/223–227
See application file for complete search history.

(56) References Cited

U.S. PATENT DOCUMENTS

| | | | | |
|---|---|---|---|---|
| 4,601,396 | A | 7/1986 | Pavie | |
| 4,615,446 | A * | 10/1986 | Pavie | 209/583 |
| 5,119,954 | A | 6/1992 | Svyatsky et al. | |
| 5,143,225 | A | 9/1992 | Rabindran et al. | |
| 5,799,800 | A * | 9/1998 | Lux | 209/559 |
| 6,316,741 | B1 | 11/2001 | Fitzgibbons et al. | |
| 6,566,620 | B1 | 5/2003 | Lohmann | |
| 6,576,857 | B1 | 6/2003 | De Leo et al. | |
| 6,598,748 | B2 | 7/2003 | Mileaf et al. | |
| 6,762,384 | B1 * | 7/2004 | Kechel | 209/584 |
| 7,096,088 | B2 * | 8/2006 | Graushar et al. | 700/223 |
| 2002/0139727 | A1 | 10/2002 | Vanderbles et al. | |
| 2003/0155282 | A1 | 8/2003 | Kechel | |
| 2004/0007510 | A1 | 1/2004 | Kechel | |
| 2004/0031732 | A1 | 2/2004 | Whitnable | |
| 2004/0040898 | A1 | 3/2004 | Kechel | |
| 2005/0056573 | A1 * | 3/2005 | Berdelle-Hilge | 209/584 |
| 2005/0218046 | A1 * | 10/2005 | Mileaf et al. | 209/584 |
| 2006/0283784 | A1 * | 12/2006 | Roth et al. | 209/584 |

* cited by examiner

*Primary Examiner*—Stefanos Karmis
*Assistant Examiner*—Kalyanavenkateshware Kumar
(74) *Attorney, Agent, or Firm*—Leland Schultz, Esq.; Robert Mlotkowski Safran & Cole, P.C

(57) ABSTRACT

An operational process for product distribution includes grouping product into groups when the product is in a first sort level and sorting the groups of product, in a first pass operation, to a second level sort. The method further includes sequencing the second level sort product including late arriving product, in a second pass operation, into a sequence of product. A machine readable code can also be used to implement the functionality of the operational process.

6 Claims, 7 Drawing Sheets

OPERATIONS FOR PRODUCT PROCESSING

CROSS REFERENCE TO RELATED APPLICATIONS

The present application is a divisional application of U.S. application Ser. No. 11/018,677, filed on Dec. 22, 2004, now U.S. Pat. No. 7,507,930 the contents of which are incorporated by reference in their entirety herein.

BACKGROUND OF THE INVENTION

1. Field of the Invention

The invention generally relates to improving product processing operations and, more particularly, to a method of improving the operations process employed within the United States Postal Service (USPS) to process flat mail pieces.

2. Background Description

The sorting of mail is a very complex, time consuming task. In general, the sorting of mail is processed through many stages, including front end and back end processes, which sort and sequence the mail in delivery order sequence. These processes can either be manual or automated, depending on the mail sorting facility or the type of mail to be sorted such as packages, flats, letter and the like. A host of other factors may also contribute to the automation of the mail sorting, from budgetary concerns to modernization initiatives to access to appropriate technologies to a host of other factors.

In general, however, most modern facilities have taken major steps toward automation by the implementation of a number of technologies. These technologies include, amongst others, letter sorters, parcel sorters, advanced material handling flat sorters and the like. As a result of these developments, postal facilities have become quite automated over the years, considerably reducing mail processing costs.

In current processing operations, the flat mail (i.e., magazines, catalogues, brochures and the like) operations of the United States Postal Service (USPS) includes an automated sort to the individual carrier level, with further manual processing required to place the flats in delivery point sequence (DPS), also known as carrier walk sequence. Recently, though, the USPS initiated development of a Flats Sequencing System (FSS) which is aimed at fully automating the flat mail stream, including the sequencing of the flats in DPS. In this initiative, the USPS intends to finalize the automation of flat mail by sorting flat mail into DPS, prior to distribution to the carrier. This will reduce much of the manual sorting required by the carrier, thus increasing overall time the carrier actually spends delivering the mail.

By way of illustration, FIG. 1 shows the flats processing operations currently implemented by the USPS from the regional processing center through the local delivery units (DU), commonly known as local post offices, for example. This implementation is not especially efficient and, in fact, requires, at least three sorting passes using up to three different sorting machines, in addition to extensive manual intervention. Also, this process cannot sort and sequence late arriving mail pieces prior to delivery to a carrier.

By way of illustration, in current operations, regional postal facilities automatically sort the flat mail pieces to carrier route levels; but, the sort still requires manual DPS by the carrier. In this illustration, the flat mail pieces originate from many different sources, including other regional postal facilities, local incoming mail, as well as a host of other processing facilities such as, for example, magazine and catalog bulk mailers.

In this illustration, the mail pieces from these different processing locales may be presented to the sorting postal facility at different sorting levels, e.g., carrier level, regional level and the like. As an example, magazine and catalog bulk mailers and some regional postal facilities may provide the flat mail pieces in a carrier route sort; whereas, other regional facilities and the incoming flat mail pieces may be in no particular sort order. Instead, the local incoming flat mail pieces may simply be in carts for a particular local region, in no specific order.

In the incoming mail operations, the mail is first “opened” (180) which consists of taking the mail off carts for distribution to different machines. Once the mail is opened, the mail is either (i) prepared for machine operations (035) or (ii) directly inducted to one of three sorting operations, including an incoming primary operation (334), an incoming secondary operation (816) or a manual incoming primary operation (170). As can be envisioned, though, the preparation operations are not trivial operations, and require extensive manual labor at the arrival dock and/or automation via bundle sorters. This upfront work is required to ensure that the mail does not undergo unnecessary sortation, based on the worksharing incentives provided by the USPS. For example, the product may already be in a carrier sorted order, and thus can be forwarded directly to the DPS operation, which presently occurs by the carriers at the DU.

If the flat mail pieces are routed to the incoming primary operation (334), the flat mail pieces will be sorted to a certain level such as, for example, to a five digit level of the zip code, sometimes referred to as a zone. On the other hand, when the flat mail pieces are routed to the incoming secondary operation (816), the flat mail pieces may be sorted to the actual carrier routes within the zone. This is known as a “zone-based” processing.

Although the flat mail pieces are typically routed directly to the incoming primary operation (334), some flat mail pieces may be initially directed to the incoming secondary operation (816) for processing. For example, if the flat mail pieces have already been sorted to a certain sort level, these flat mail pieces may be fed directed to the incoming secondary operation (816). However, as seen in FIG. 1, only a small majority of the flat mail pieces are initially routed to the incoming secondary operation (816).

In a small set of instances, some of the flat mail pieces are routed to the manual operation (170). In these cases, the flat mail pieces cannot be sorted by automated processes due to many different reasons such as, for example, unreadable address information. The manual operation, of course, adds to the overall processing costs and reduction of efficiency of the operations.

In any event, the above operations are used to sort the flat mail pieces to a carrier level, i.e., a carrier route sort. This sorted mail is then provided to the incoming dispatch (126) and transported to the DUs. However, some flat mail pieces may be sorted to other high volume local destinations such as hospitals, colleges, large businesses or rural areas directly from the incoming primary operation (334).

On the other end of processing, bulk mailing is provided to the incoming dispatch (126) or provided to a small parcel bundle sorter (SPBS) operation (137). The preparation of the bundles in the SPBS operation includes sorting the bundles to segregate them into various presort levels. This sorting operation results in occasional breakage and damage of the bundles, and additionally requires extensive human staffing.

After the mail is provided to the SPBS (137), a portion of the flat mail pieces are prepared in the manner described above (035), and then fed to the incoming primary operation (814, 334), the manual incoming primary operation (170) or the incoming secondary operation (816, 336). Once the flat mail pieces are properly sorted, this bulk mail may then be sent to the incoming dispatch (126) or to another processing and distribution center.

Once the sorted flat mail pieces arrive at the DU, it is manually sequenced by the carrier. However, prior to this manual sequencing, late arriving flat mail pieces are first sorted into carrier route, manually by a clerk at operational stage (777). Then, these late arriving mail pieces and the previously sorted flat mail pieces are then manually sequenced into walk order sequence by the carrier along with additional bulk mail, such as saturation mail, at the DPS operational stage (740). The mail is then delivered at operation stage (739).

Currently 100% of the flat mail must be manually sorted to DPS, which is a very time consuming and labor intensive process. This is mainly due to the fact that the best automation can achieve in the allowable time is sorting to the carrier level. In addition, current processing operations cannot efficiently sort late arriving mail. At best, the late arriving mail is received at the regional level and receives only a quick automatic sort to zone level, which includes undergoing two manual sortation passes at the DU to achieve DPS. As such, late-arriving mail can only be sorted to the destination post office, where it is manually sorted to the carrier level. This manual sorting takes 2 to 3 hours each delivery day per carrier, multiplied by 300,000 carriers nationwide.

Also, by using the current processing operations, all sorting by the sorting facility must be completed and delivered to a carrier no later then, for example, 8 AM. This allows the carrier ample time to sequence the mail in DPS. To reduce the inefficient manual processing at the DU, current processes must be modified to accommodate automation of the DPS function without impacting the dispatch schedules currently in place.

SUMMARY OF THE INVENTION

In a first aspect of the invention, an operational process includes grouping product into groups when the product is in a first sort level and sorting the groups of product, in a first pass operation, to a second level sort. The method further includes sequencing the second level sort product, including late arriving product, in a second pass operation, into a sequence of product.

In another aspect of the invention, the operational process includes grouping product into discrete groups based on common product attributes. These common product attributes may include a carrier route, for example. The operational process further includes sorting each product of the discrete groups of product in separate sorting processes to provide a finer granularity of sort level than in the grouping step. The late arriving product, associated with a group yet to be sorted, can be cascaded to another sorting process of the separate sorting processes for sorting or sequencing with the product of the associated group.

In yet another aspect of the invention, the operational process can determine a maximum efficiency of sorting operations with different product types. This process includes, with no order being connoted by the numerals:

(i) estimating an amount of a first type of product to be processed in a given time period based on historical data (H);

(ii) providing a known performance of a sorting machine during a requisite time period for sorting processes (P);

(iii) supplying a known value (V) of a second type of product; and (iv) calculating an amount of a third product that can be processed based on the previous steps.

In another aspect of the invention, an operational process for processing mail pieces simultaneously on at least two machines, where each of the machines having bin partitions allocated for operations is provided. The operational process, in a first machine, includes processing simultaneously, in a first time period, in respective allocated partitions:

(i) incoming group and outgoing primary sorting operations;

(ii) outgoing primary sorting operations; and (iii) outgoing carrier group holdout mail pieces.

In a second time period, the first machine provides a delivery point sequencing operation and, a third time period, a residual sorting operation for late arriving mail items which were not processed in the first or second time period. The operational process further includes, in a second machine, processing simultaneously, in the first time period, outgoing Group Sort operations; and processing simultaneously, in the second time period and the third time period, a delivery point sequencing operation.

A machine readable medium containing code may also be implemented for providing the processes described above.

BRIEF DESCRIPTION OF THE DRAWINGS

The foregoing aspects and advantages will be better understood from the following detailed description of embodiments of the invention with reference to the drawings, in which.

DETAILED DESCRIPTION OF EMBODIMENTS OF THE INVENTION

Figure 1:
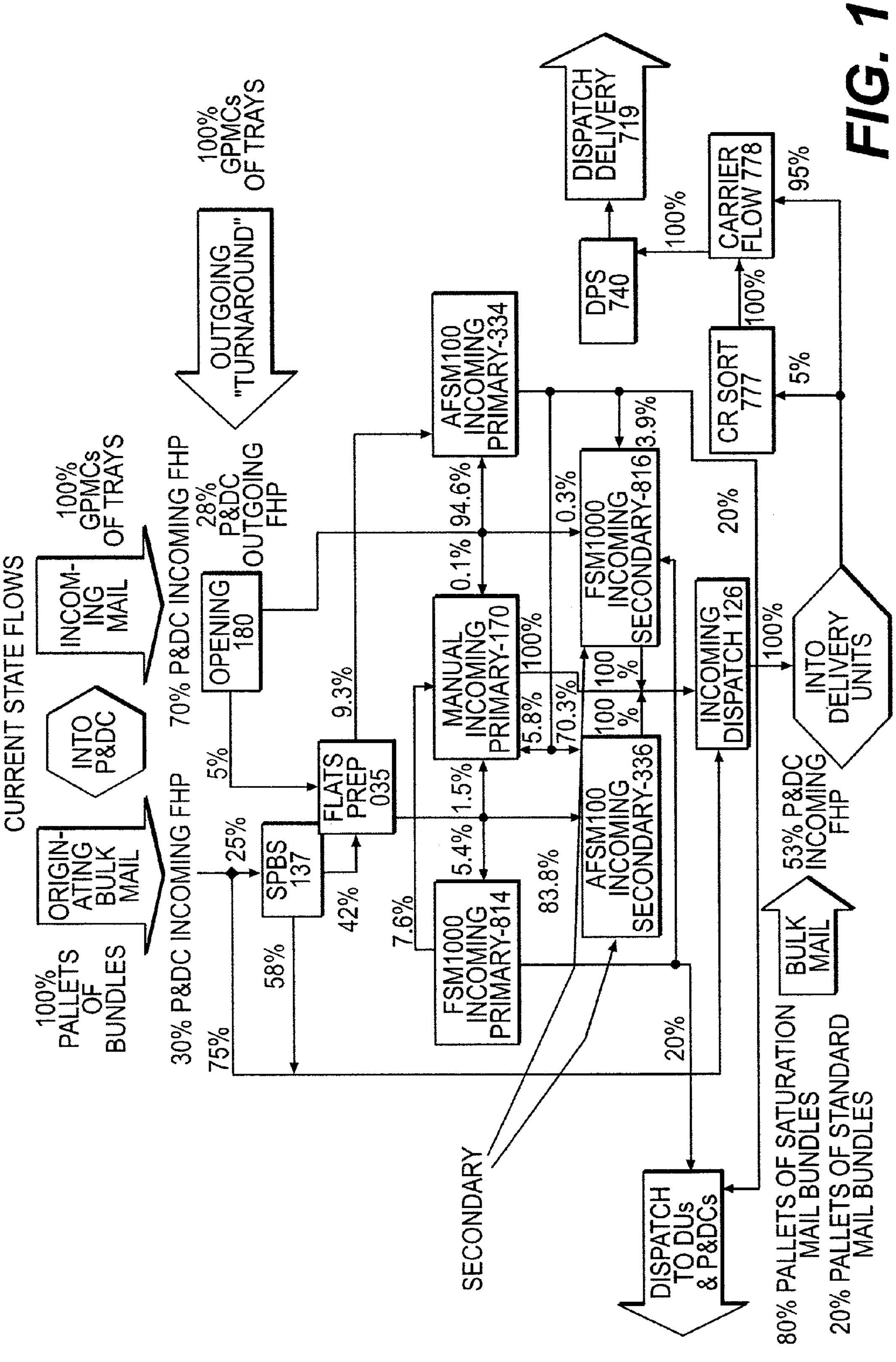
FIG. 1 shows a general diagram of typical processing operations currently used by the USPS.

The invention is directed to mail processing operations and, more particularly, to a method of improving the operations process employed within the United States Postal Service (USPS) to process flat mail pieces. In aspects of the invention, the processing operations significantly reduce the labor intensive manual DPS process, and provide an overall reduction in manual labor associated with handling mail pieces and containers (i.e., trays/tubs of flat mail), within an allotted amount of time as prescribed by the USPS.

In one aspect of the invention, the improved flat mail processing operations groups the products together, and then sorts the product to a finer granularity, e.g., in sequence, prior to delivery to a carrier. By grouping the product, it is now possible to sequence late arriving mail using cascading sequencing stages.

In another aspect, the invention leverages state of the art flats sorting machines which have greater capabilities than current sorting and sequencing machines. For example, such state of the art machines may provide throughput of flat mail pieces at approximately 38,000 flats per hour, in addition to providing a significantly greater number of sorting bins, i.e., 360 bins. However, the invention is not limited to such machines, and may equally be implemented with current technologies. Additionally, other applications such as warehousing and storage applications are also contemplated for use with the invention.

General Overview of Processing Operations in Accordance with the Invention

In aspects of the invention, three distinct sorting operations are provided to maximize the overall efficiency of sorting operations. These operations allow the USPS (or other sorting and distribution facility) to realize significant labor savings using state of the art sorting machinery, in combination with or alternatively using current sorting technologies. By using the sorting operations and overall processing operations provided herein, extensive automation may be achieved within the allowable time for sorting operations (generally by 7:30 AM, every day, as prescribed by the USPS). This automation allows late arriving product to be sequenced prior to delivery to a carrier.

In general, the following sorting operations may be provided: Group Sort Operation, DPS Operation, and Carrier Sort Operation. These operations will be discussed in more detail below.

Group Sort Operation

Group Sort Operation sorts flat mail pieces for inward destinations into groups of carrier routes, henceforth referred to as “groups”. The specific carrier routes that comprise each group are configurable to meet each processing facilities’ unique distribution needs.

During Group Sort Operation, the sorting system concurrently sorts mail to outward destinations such as, for example, other large processing facilities, as well as to groups of carriers, within outward or inward destinations. By using a system with increased bin space, each site can configure its outward bins to accept sortation on the machine to groups of carrier routes, rather than just outward destination. This would ideally be reserved for the outward destinations with the highest daily volumes of mail, and shortest delivery time.

The Group Sort Operation should begin when there are enough flat mail pieces in the facility to make staffing the machine profitable, generally starting around noon for inward mail, but typically starting by about 3 PM for outward mail. By 11 PM, the outward sort should be complete, and dispatched from the facility. Meanwhile, the Group Sort Operation for inward mail may continue through the night or other predetermined time period.

To solve the problem of late arriving mail streams, the Group Sort Operation is designed to continue to run on a certain number of bins on one or more of the sorting machines, while other bins for that machine as well as other bins on any other machine are assigned to the DPS Operation (discussed below). By running Group Sort Operation throughout the night, late arriving mail or other product can be accumulated into groups to facilitate a quick second pass sort to carrier route just prior to dispatch.

DPS Operation

DPS Operation allows for the automation of sequencing of the product prior to dispatch. This minimizes any manual sequencing required by the carrier, thus increasing the overall efficiency of the carrier.

In one illustrative example, at approximately 11 PM or other predetermined time period, DPS Operation begins. In one implementation, the DPS Operation includes a two-pass operation, e.g., the mail is run through the machine twice, and results in the flat mail pieces or other product being sorted into DPS order. The DPS Operation is capable of processing one group (from Group Sort) at a time through the two passes. And, after one group is complete, the next group undergoes DPS Operation.

In one aspect of the invention, the DPS Operation is started early enough such that all groups are processed by 7 AM, or other predetermined time period as required by the USPS. This operation also addresses late arriving mail or other product, e.g., approximately 14% of the flat mail stream arriving after 10 PM and approximately 5% of the flat mail stream arriving after 2 AM.

When a new group begins its DPS Operation, any late arriving mail that has accumulated for that group can be processed with the mail that was processed during the normal Group Sort window. In this way, the late arriving mail is processed to the DPS level along with the rest of the mail. In fact, the later a group is run on DPS Operations, the greater the chance that the late arriving mail can be included in the operations, as discussed in more detail below.

Carrier Sort Operation

Carrier Sort Operation is introduced upon the conclusion of the DPS Operation. In this Operation, the carrier sort takes each of the various groups of late arriving mail that missed the DPS window and sorts each group of carrier routes into one dedicated bin per carrier. The end result is that by approximately 7:30 AM, nearly all of the flat mail pieces or other type of product have been automatically sorted to DPS, with the minimized amount of “residual” volume” sorted to carrier routes. When the carriers receive the processed product, the DPS product is ready for delivery, and there is minimal manual labor required to sort the “residual” volume into delivery order.

Processing Operation of the Invention

Figure 2:
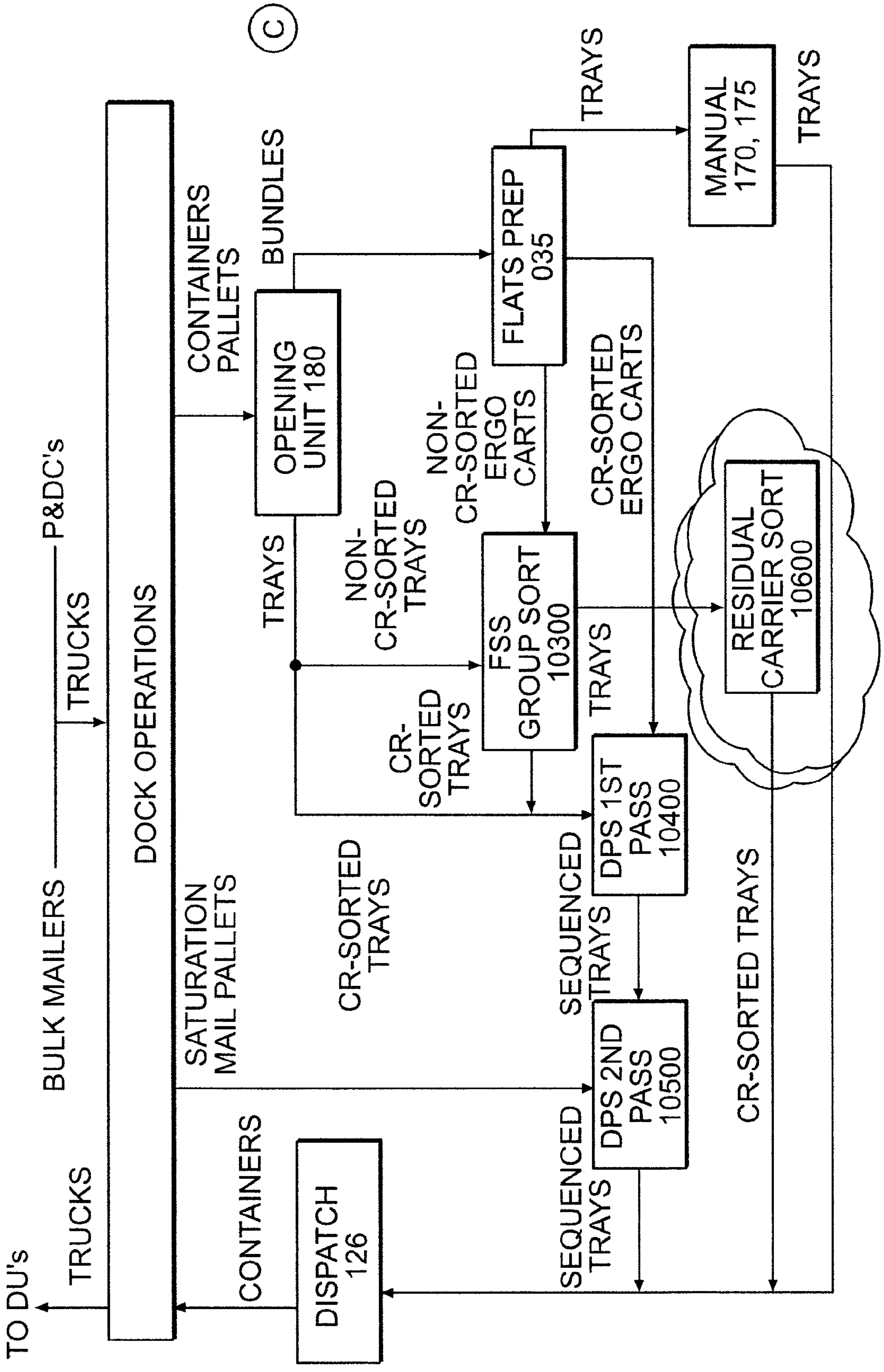
FIG. 2 is a schematic diagram of the operational processes in accordance with the invention.

Referring now to FIG. 2, a schematic diagram of the operational processes in accordance with the invention is shown. The operational processes of the invention, as shown throughout, may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Referring to FIG. 2, in one implementation, the incoming mail is provided to the opening operation (180). At this operational stage (180), the mail is opened and a determination is made as to whether the flat mail pieces (e.g., product) are already sorted to a carrier route and if bundles are present. If the product is in bundles, the bundles are directed to the flats preparation operation (035), while the remaining product is sent to the Group Sort operation (10300) or the DPS 1$^{st}$ pass operation (10400), depending on the pre-sort level of the product. The Group Sort operation (10300) eliminates the need for SPBS processing operation (137) shown in FIG. 1.

The determination may be made based on product attributes such as, for example, address information, carrier route information, sort level information or other product information. Additionally, this determination, as well as all other required logic herein, is provided by one or more coordinated controllers, generally depicted as reference character "C".

In more particularity, after the opening unit operation (180), non-carrier route sorted product are provided to the Group Sort operation (10300) and the carrier sorted product are provided to the DPS $1^{st}$ pass operation (10400). Also, the product that has been prepared at the operational stage (035) is provided to the Group Sort operation (10300), the manual sorting operations (170, 175) or the DPS $1^{st}$ pass operation (10400), depending on the pre-sort level. The Group Sort operation will sort the non-carrier route sorted product into groups, and the DPS $1^{st}$ pass operation (10300) will sort the product to a carrier level, in one implementation of the invention.

Still referring to FIG. 2, after passing through the DPS $1^{st}$ pass operation (10400), the product is provided to the DPS 2 pass operation (10500) for sequencing of the product into a walk order sequence, DPS. This operation will also include feeding and sequencing of the saturation mail, which bypasses the DPS $1^{st}$ pass operation (10400). Basically, with saturation mailing or operations, there is no need to use the DPS $1^{st}$ pass operation since the saturation product will be delivered to an occupant for every delivery point in the carrier route. In one aspect of the invention, the saturation product may be placed in a buffer until the DPS $2^{nd}$ pass operation is required, at which time, the saturation product will be inducted into the system with the DPS $1^{st}$ pass sorted product. By placing the saturation product into the DPS $2^{nd}$ pass operation, manual sorting of the saturation mail is eliminated.

After the DPS $2^{nd}$ pass operation (10500), the sequenced product, in addition to carrier sorted product from a residual carrier sort operation (10600), are provided to the dispatch (126). The residual carrier sort operation (10600) typically includes the sorting of some late arriving mail to a certain sort level. However, due to the processes implemented herein, and discussed in greater detail below, much late arriving product can be automatically sequenced. Thus, unlike that described with reference to FIG. 1, the product is now provided in a sequenced order to the carrier, eliminating substantially all manual processing operations.

Figure 3:
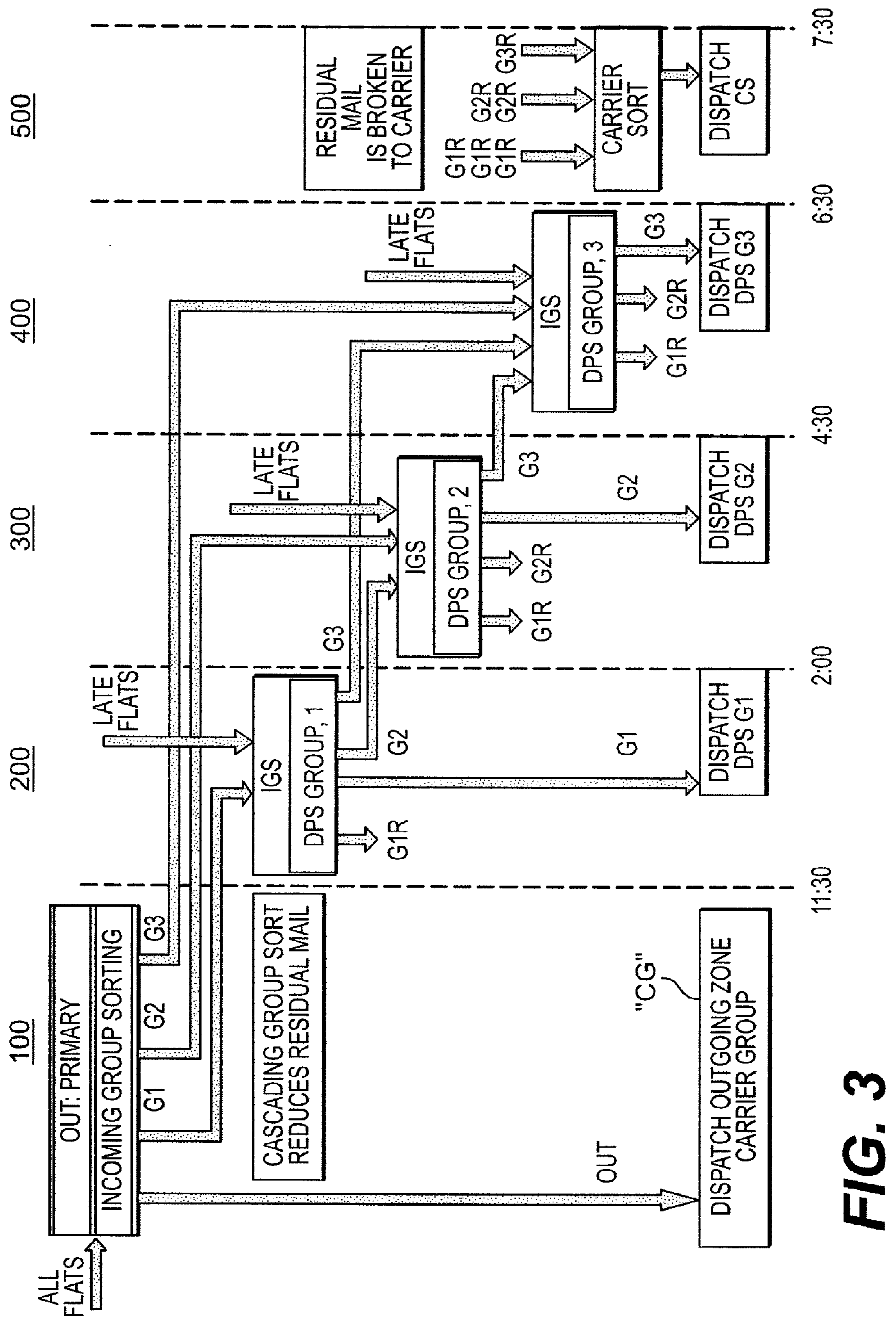
FIG. 3 shows a cascading Group Sort in accordance with the invention.

FIG. 3 shows an automated sequencing of the group product in accordance with the invention. This representation additionally shows the processing, i.e., automated sequencing, of late arriving product, in addition to the sequencing of the grouped product. Initially, product is fed into the system, with outgoing primary product being sorted to, for example, three or five digits of the zip code, at operational stage 100. This sorting process may require, in one implementation, about 100 sorting bins, with the sorted product being sent to the dispatch outgoing zone, carrier group, designated as "CG".

Still referring to FIG. 3, the incoming group product is then sorted according to four group processes, indicated generally by reference numerals 200, 300, 400 and 500. That is, generally:

(i) incoming product for group G1 and any late arriving mail is processed in operational stage 200 between 11:30 PM and 2:00 AM;

(ii) incoming product for group G2 and any late arriving mail is processed in operational stage 300 between 2:00 AM and 4:30 AM;

(iii) incoming product for group G3 and any late arriving mail is processed in operational stage 400 between 4:30 AM and 6:30 AM; and (iv) residual product including the late arriving product for groups G1, G2 or G3 are processed in operational stage 500 between 6:30 AM and 7:30 AM.

As should be understood by those of skill in the art, the above process is not limited to only three groups. Accordingly, the above process, depending on the unique attributes of the sorting facility, may be implemented with more or less than three groups.

Referring to FIG. 3 in more particularly, in operational stage 200, product from group GI and any late arriving product is processed in the $1^{st}$ and $2^{nd}$ pass DPS operation. This sequenced product is then provided to the dispatch. In this operational stage, all product for group G2 and G3 is cascaded to the respective operational stage 300 or 400.

In operational stage 300, the product from group G2 and any late arriving product is then processed in the $1^{st}$ and $2^{nd}$ pass DPS operation. This sequenced product is then provided to the dispatch, with all product for group G3 being cascaded to the operational stage 400, and any residual product for group G1 being cascaded to operational stage 500.

In operational stage 400, the product for group G3, cascaded from operational stages 100, 200 and 300, is processed in the $1^{st}$ and $2^{nd}$ pass DPS operation during a two hour time span. The sequenced product is then provided to the dispatch, with any product for groups G1 and G2 being provided to operational stage 500 for processing with all of the remaining residual product, in additional to product cascaded from the previous operational stage(s). The product in operational stage 500 will be sorted to a carrier route level and dispatched to the carrier for final sequencing, as shown and discussed with reference to FIG. 2. However, due to the groupings and/or cascading process, much of the late arriving product has already been sequenced, thus saving significant time and effort on the part of the carrier.

Figure 4:
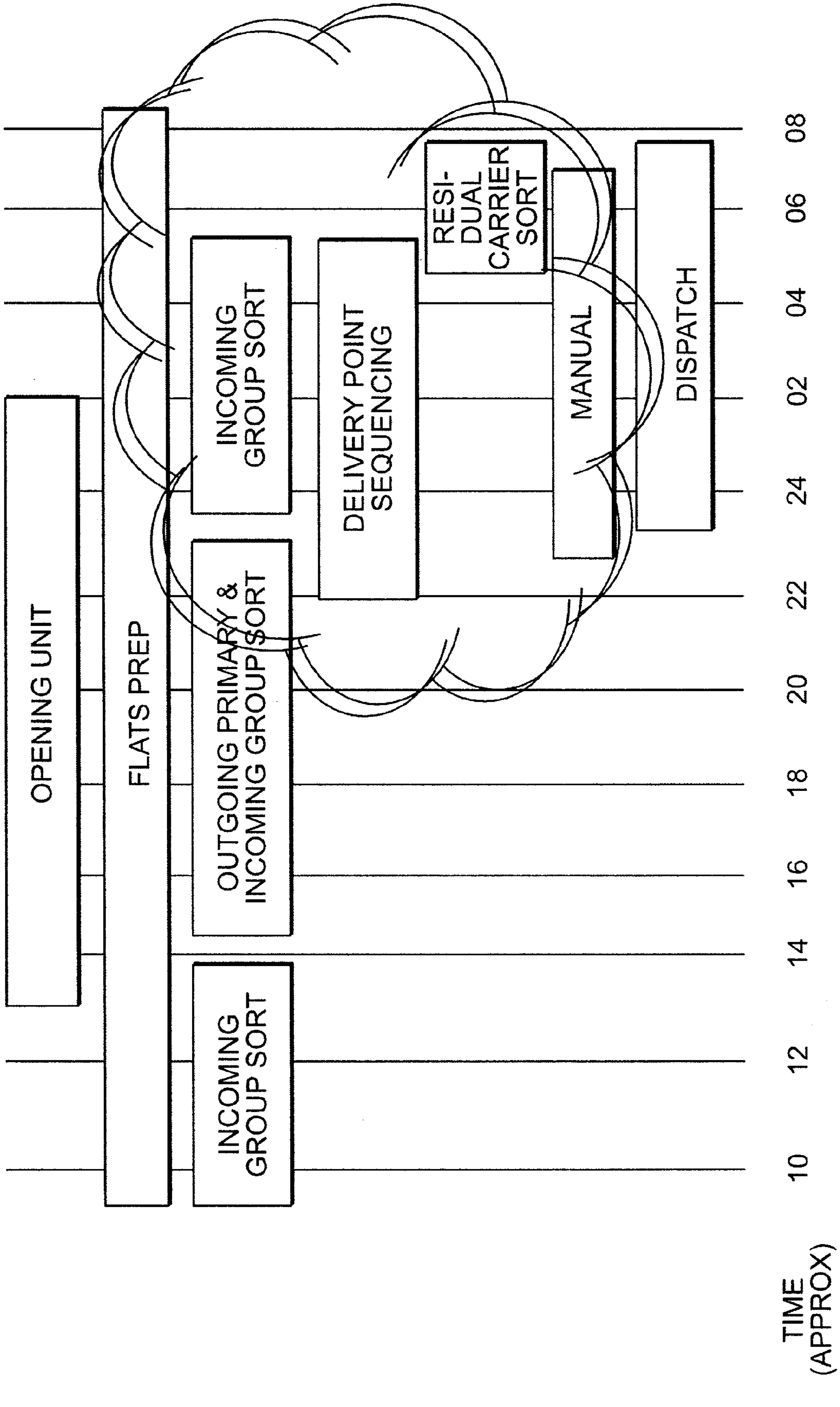
FIG. 4 shows processing operations in accordance with the invention.

FIG. 4 shows the processing operations of the invention from approximately 10 AM to approximately 8 AM, the following morning. Although FIG. 4 shows the processing of product based on specific times of the day, it should be recognized that the invention is not limited to only these specific times. Instead, the invention applies to the overall operational processes including the cascading and overall sequence of operations.

In FIG. 4, the opening operation is available for approximately 13 hours, e.g., approximately 1 PM to 2 AM, with the product preparation operation available for approximately 22 hours, e.g., approximately 10 AM to 8 AM. Incoming group sorting is available for approximately 16 hours, e.g., approximately 10 AM to 4 AM, with outgoing product processing available for about 10 hours, e.g., approximately 2 PM to 12 AM. The sequencing of the incoming Group Sort is available for approximately 8½ hours, e.g., approximately 10 PM to 6:30 AM, with residual carrier sorting occurring for approximately 1 hour, e.g., approximately 6:30 AM to 7:30 AM. Manual sorting can occur for approximately 8 hours, e.g., approximately 11 PM to 7 AM. Lastly, the product is provided to the dispatch for approximately 8 hours, e.g., approximately 11 AM to 7 AM.

The operational processes of the invention can now sequence the product into DPS within the time prescribed by the USPS, by overlapping many of the processes. These overlaps may include, for example, a portion of the sorting and sequencing, as well as the preparation and opening stages, to name a few processes.

Figure 5:
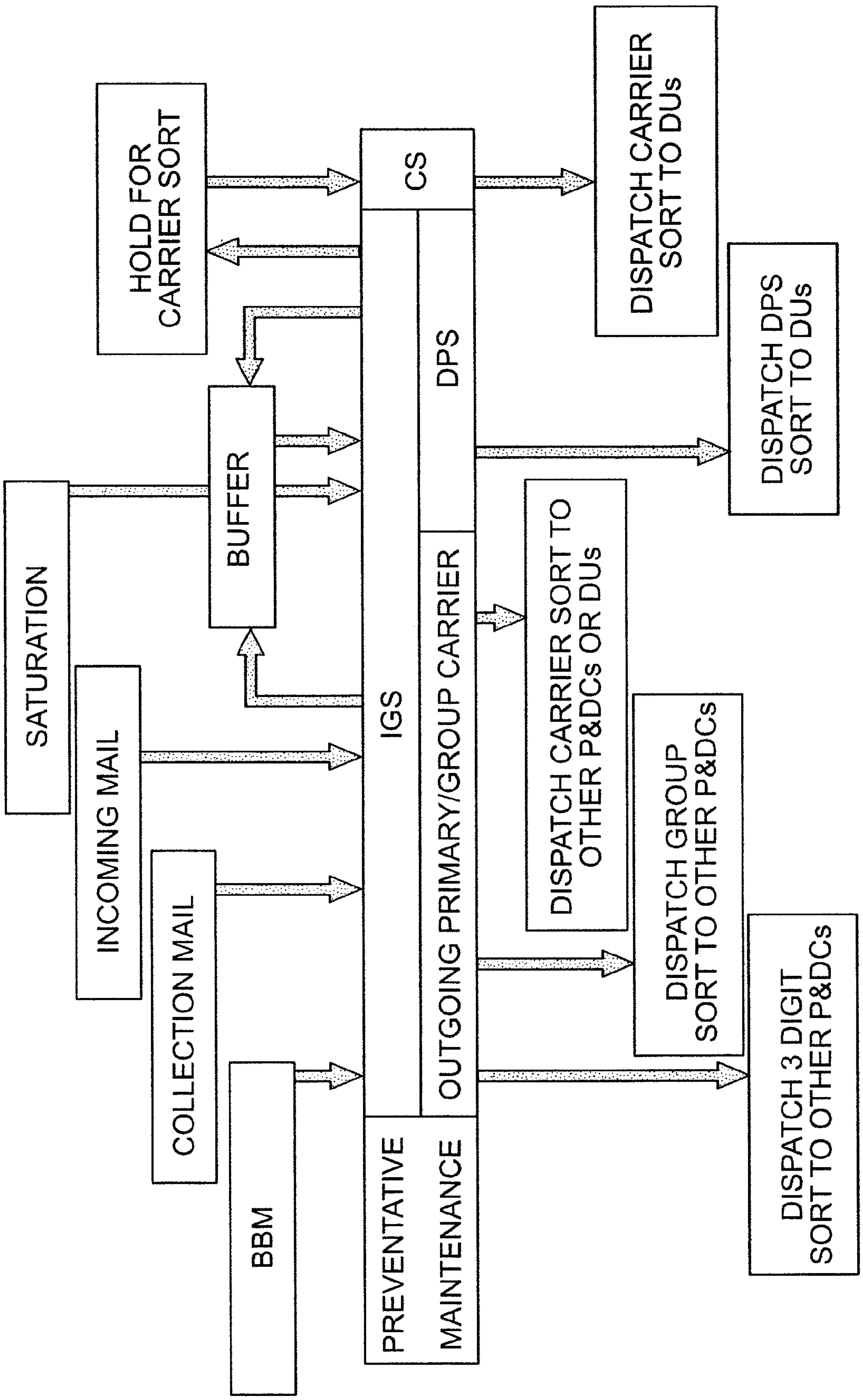
FIG. 5 shows processing for different types of product in accordance with the invention.

FIG. 5 shows processing for different types of product. The product may include bulk business mail (BBM), collection mail (e.g., mail that has not been sorted to any level such as mail that is collected directly by the carrier, mail that is deposited directly at the local post office, etc.), incoming mail and saturation mail (e.g., mail that is to be delivered to nearly every address within a certain region).

In FIG. 5, routine maintenance of the systems may be performed prior to induction of the BBM, collection mail, incoming mail and saturation mail. After maintenance is performed, the BBM, collection mail, incoming mail and saturation mail is provided to the incoming Group Sort operation (10300). After the incoming group sorting operation, the grouped mail may be held with sorted incoming mail for DPS in a buffer for example. At the appropriate time, the held product (and late arriving product) is then sequenced in the DPS operational stages, with some late arriving product being sorted to the carrier sort level. The sequenced mail may also be dispatched to the appropriate destination.

In one aspect of FIG. 5, the collection mail may also be provided directly to the outgoing primary/group/carrier operational stage. That is, the product for delivery to other postal sorting facilities may be processed to a certain level depending on the capacity of the other postal sorting facility and/or agreements amongst the regional facilities. For example, the collection mail may be sorted to:

(i) a 3 digit sort, which designates a certain postal facility, (ii) a Group Sort, or (iii) a carrier sort level.

Once the mail is sorted to any of the three levels (i), (ii) or (iii), the mail may be delivered, respectively, to (i) other processing and distribution centers (P&DCs) or DUs in carrier sort; (ii) other P&DCs in Group Sort; or (iii) other P&DCs in a carrier sort.

Figure 6:
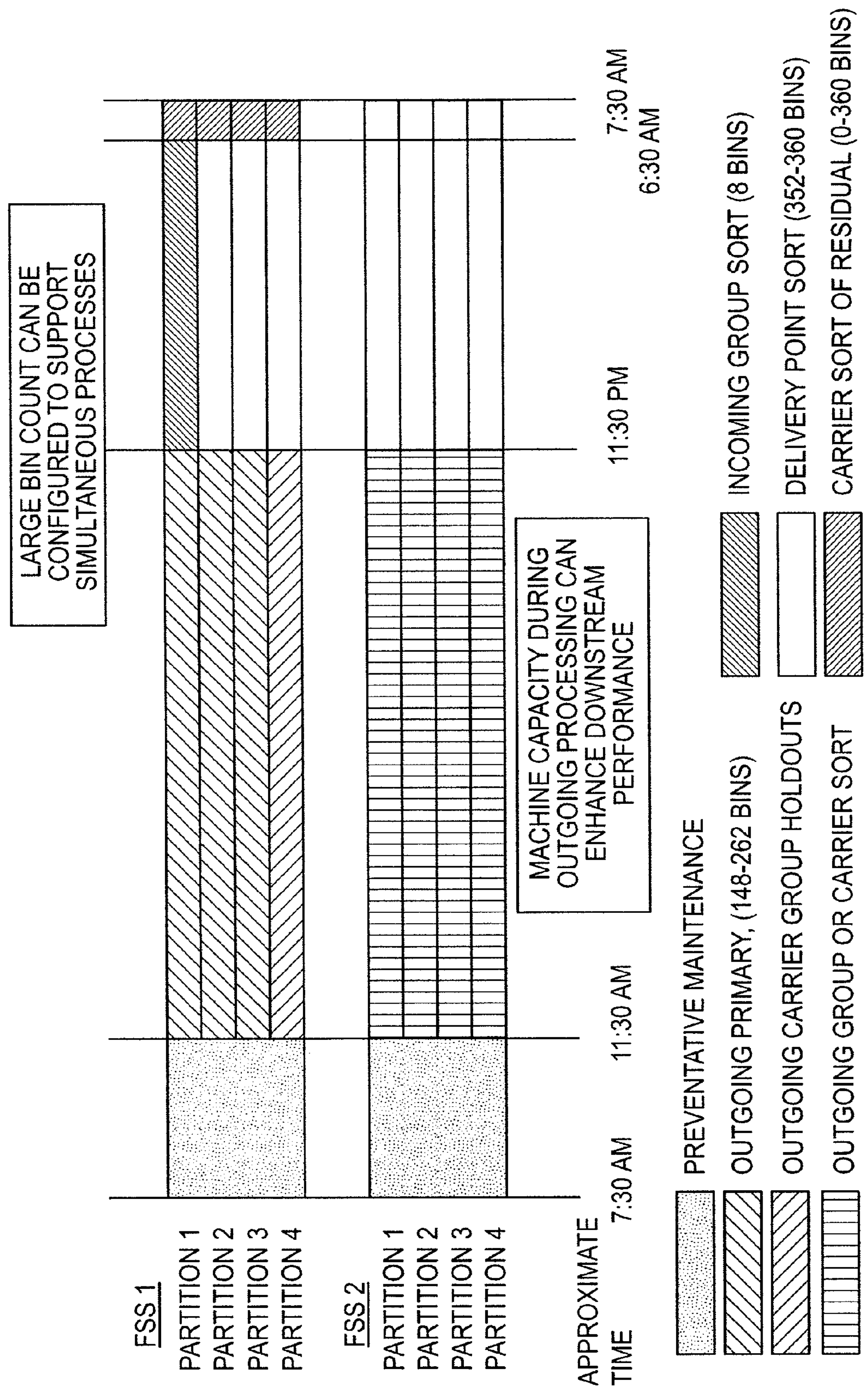
FIG. 6 shows an exemplary mail processing operation in accordance with the invention.

FIG. 6 shows an exemplary processing operation in accordance with the invention using a flats sequencing system (FSS) with 360 bins. The 360 bins are represented as partitions 1 through 4, each having 90 bins in this example. In this implementation, maintenance may be provided for approximately four hours each day, e.g., approximately 7:30 AM to 11:30 AM. For approximately 12 hours, e.g., 11:30 AM to 11:30 PM, the following operations may be staged in the $1^{st}$ sequencing system:

(i) Partition 1: Incoming Group Sort and outgoing primary.

(ii) Partition 2: Outgoing primary.

(iii) Partition 3: Outgoing primary.

(iv) Partition 4: Outgoing carrier group holdouts.

During this time period, as an illustrative example, eight bins may be allocated to partition 1 of the $1^{st}$ sequencing system, and 148-262 bins may be allocated to partition 2 and partition 3. Additionally, for approximately 12 hours, e.g., 11:30 AM to 11:30 PM, partitions 1 through 4 of the 2 sequencing system may perform outgoing group or carrier sort operations.

Still referring to FIG. 6, for approximately seven hours, e.g., approximately 11:30 PM to 6:30 AM, all of the partitions for both sequencing systems may perform delivery point sequencing. In the $2^{nd}$ sequencing system, this processing may continue for approximately one more hour, e.g., approximately 6:30 AM to 7:30 AM; whereas, the $1^{st}$ sequencing system may sort the residual mail to carrier sort during this time period. In one aspect of the invention, 352-360 bins may be allocated for the delivery point sequencing operations. It should be recognized that more than two machines may also be utilized with the operational processes of the invention.

Figure 7:
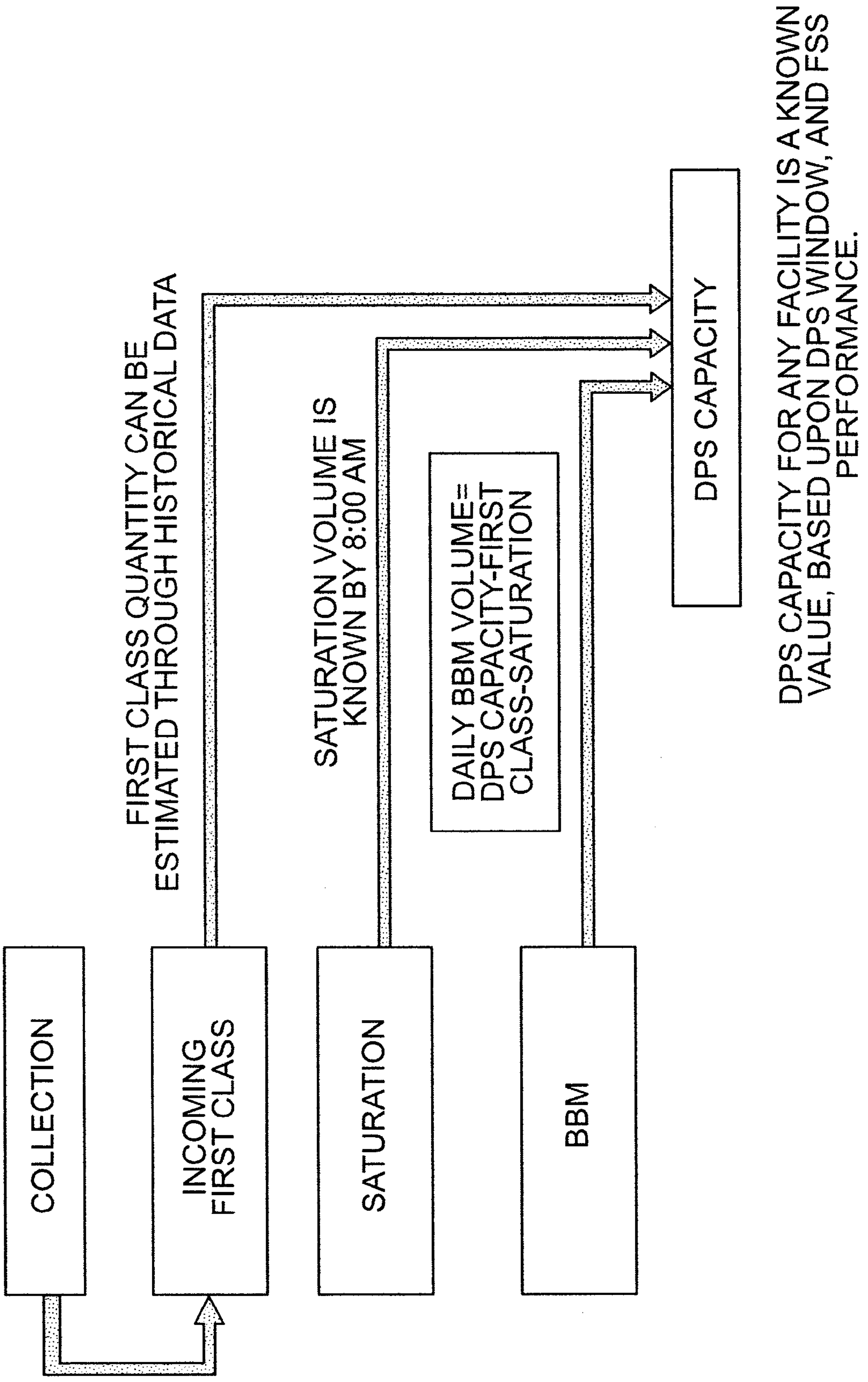
FIG. 7 shows a calculation used to estimate the amount of non-committed bulk business mail (BBM) which may be processed on a given day in accordance with the invention.

FIG. 7 shows a calculation used to estimate the amount of non-committed BBM which may be processed on a given day. As is known, $1^{st}$ class mail is "committed" mail, i.e., mail that has to be sorted in the same day as it is provided to the sorting facility; whereas, the BBM is "non-committed" mail, i.e., mail that does not have to be sorted within the same day. Accordingly, the USPS has some flexibility in sorting the BBM, compared to that of $1^{st}$ class and other types of mail. By having such flexibility, the USPS can maximize its resources and capabilities by making provisions to sort the $1^{st}$ class mail prior to the BBM, thus ensuring maximum utilization of the operations for same day turnaround of the $1^{st}$ class mail.

Specifically, as shown in FIG. 7, the $1^{st}$ class mail quantity can be estimated through historical data, and the saturation volume is known at about 8 AM. Additionally, the DPS capacity for any given sorting facility is known based upon the DPS window, as previously discussed, and the known performance of the sequencing systems. By knowing these parameters, the processing of BBM, can be calculated as follows: Daily BBM Volume=(DPS Capacity)−(First Class Mail)−(Saturation Mail)

By knowing the amount of BBM volume which may be processed on a given day, the postal service can then ensure that all $1^{st}$ class mail is processed in a same day turnaround prior to the introduction of the BBM. Also, this process can maximize the amount of BBM that can be processed on any given day. This operational process may also be implemented on any group of diverse product.

Sequencing System

In one implementation, any known sequencing system may be used to implement the invention. For example, the sequencing system used in one aspect of the invention may include conveying tracks associated with a respective feeder. A camera, optical reading device or other type of reading device is provided downstream of the feeder. A control "C" controls the sequencing system based on information received from the camera or other reading device. Diverters may be placed between sections of the conveying tracks for directing the product to the respective destination bins based on the product information such as delivery point. In one preferred aspect, the sequencing system will include 360 bins.

In embodiments, the camera or other reading type device is designed to read the delivery point or other pertinent product information provided on each product. The pertinent information is then provided to the controller "C", for controlling the functionality of the sequencing system, as well as other operational stages described herein. Those of ordinary skill in the art should appreciate that all product with a different product information can be sequenced in accordance with well known sequencing techniques such as, for example, using any known two pass sorting algorithm.

Operational Benefits

The intermingling of Group Sort Operation with the DPS Operation maximizes the percentage of the inward flat mail volume that undergoes automatic DPS processing. The final Carrier Sort, a series of quick sorts of groups of late-arriving mail, ensures that in the worst case, mail is dispatched in carrier sorts. The drastic reduction in "residual" mail or product inherent to this approach will result in significant labor savings versus current operations. Accordingly, by using the operational processes described herein, the invention can provide the following advantages, amongst others:

(i) The operational processes of the invention deviates from the zone-base paradigm via the Group Sort using a machine with up to, for example, 360 sorting bins. The single pass Group Sort Operation accomplishes the work of two passes using the current zone-based paradigm, producing a more efficient level of sortation with fewer processing hours.

(ii) The operational processes of the invention requires a maximum of three sortation passes to achieve DPS with virtually no manual processing.

(iii) The operational processes of the invention provides automated DPS operation for product, including late arriving product.

(iv) The operational processes of the invention offer a significant advantage in mail handling, in that there is no upfront bundle sorting required.

(v) The operational processes of the invention accepts bundles of mail pre-sorted to zone as well as unsorted bundles directly from the arrival dock, and sorts the mail to groups. (In contrast, in current operations, arriving bundles have to be sorted on a bundle sorter to segregate the various presort levels.)

(vi) The operational processes of the invention feature simultaneous processing of inward and outward mail, improving the productivity of personnel.

(vii) The operational processes of the invention provide a significant improvement to the processing of late arriving flat mail.

While the invention has been described in terms of embodiments, those skilled in the art will recognize that the invention can be practiced with modification within the spirit and scope of the appended claims.

It is claimed:

1. A system for processing mail pieces simultaneously on at least two machines, each of the machines having bin partitions allocated for operations, comprising:

in a first machine, processing simultaneously, in a first time period, in respective allocated partitions:

(i) incoming group and outgoing primary sorting operations;

(ii) outgoing primary sorting operations; and (iii) outgoing carrier group holdout mail pieces;

processing simultaneously, in a second time period, a delivery point sequencing operation; and processing simultaneously, in a third time period, a residual sorting operation for late arriving mail items which were not processed in the first or second time period; and in a second machine, processing simultaneously, in the first time period, outgoing Group Sort operations; and processing simultaneously, in the second time period and the third time period, a delivery point sequencing operation, wherein the residual sorting operation for late arriving mail items includes cascading late arriving mail items into different sorted groups of mail which are then subjected to a delivery point sequencing operation.

2. The system of claim 1, wherein the first and second machine each have 360 bins, represented by four equally divided partitions 1 through 4, each having 90 bins.

3. The system of claim 1, wherein:

approximately eight bins are reserved for the incoming Group Sort operations;

approximately 148 to 262 bins are reserved for outgoing primary sorting operations;

any of the bins are reserved for the residual sorting operation for late arriving mail items; and approximately 352 to 360 bins are reserved for the delivery point sequencing operation.

4. The system of claim 1, wherein the first and second machines each have a number of bins, represented by four equally divided partitions.

5. The system of claim 1, wherein:

a number N of the bins are reserved for the incoming Group Sort operations;

a number $N_1$ of the bins are reserved for outgoing primary sorting operations;

any of the bins are reserved for the residual sorting operation for late arriving mail items; and a number $N_2$ of the bins are reserved for the delivery point sequencing operation.

6. A machine readable medium containing code for processing mail pieces simultaneously on at least two machines, each of the machines having bin partitions allocated for operations, comprising at least one module to provide function to:

in a first machine, processing simultaneously, in a first time period, in respective allocated partitions:

(iv) incoming group and outgoing primary sorting operations;

(v) outgoing primary sorting operations; and (vi) outgoing carrier group holdout mail pieces;

processing simultaneously, in a second time period, a delivery point sequencing operation; and processing simultaneously, in a third time period, a residual sorting operation for late arriving mail items which were not processed in the first or second time period; and in a second machine, processing simultaneously, in the first time period, outgoing Group Sort operations; and processing simultaneously, in the second time period and the third time period, a delivery point sequencing operation, wherein the residual sorting operation for late arriving mail items includes cascading late arriving mail items into different sorted groups of mail which are then subjected to a delivery point sequencing operation.

* * * * *